(12) United States Patent
Zhang

(10) Patent No.: US 9,881,589 B2
(45) Date of Patent: Jan. 30, 2018

(54) BACKLIGHT SOURCE DRIVING CIRCUIT AND DISPLAY APPARATUS

(71) Applicant: BOE TECHNOLOGY GROUP CO., LTD., Beijing (CN)

(72) Inventor: Kailiang Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 619 days.

(21) Appl. No.: 14/381,358

(22) PCT Filed: Dec. 12, 2013

(86) PCT No.: PCT/CN2013/089153
§ 371 (c)(1),
(2) Date: Aug. 27, 2014

(87) PCT Pub. No.: WO2015/003459
PCT Pub. Date: Jan. 15, 2015

(65) Prior Publication Data
US 2015/0325205 A1    Nov. 12, 2015

(30) Foreign Application Priority Data

Jul. 11, 2013   (CN) .......................... 2013 1 0291599

(51) Int. Cl.
*G09G 5/10*    (2006.01)
*G09G 5/18*    (2006.01)
(Continued)

(52) U.S. Cl.
CPC ................. *G09G 5/10* (2013.01); *G09G 3/32* (2013.01); *G09G 5/18* (2013.01); *H05B 33/0815* (2013.01);
(Continued)

(58) Field of Classification Search
CPC .. G09G 5/10; G09G 3/32; G09G 5/18; G09G 2330/021; H05B 33/0815; H05B 33/0845; H09G 3/3406; Y02B 20/346
See application file for complete search history.

(56) References Cited

U.S. PATENT DOCUMENTS 4,352,998 A * 10/1982 Baker ................. H03F 3/45479
327/379
4,623,883 A * 11/1986 Konen ..................... G06F 13/22
340/2.9
(Continued)

FOREIGN PATENT DOCUMENTS

CN      1787714 A    6/2006
CN      1858980 A    11/2006
(Continued)

OTHER PUBLICATIONS

Chinese Office Action of Chinese Application No. 201310291599.4, dated Dec. 29, 2014 with English translation.
(Continued)

*Primary Examiner* — Sejoon Ahn
(74) *Attorney, Agent, or Firm* — Collard & Roe, P.C.

(57) ABSTRACT

There are disclosed a backlight source driving circuit and a display apparatus. The backlight source driving circuit comprises a switch field effect transistor (Q1), a freewheeling field effect transistor (Q2), a power supplying module, a control module, a LED group (Z) and a feedback module, the power supplying module is configured to supply power to the LED group (Z), the control module is configured to control turn-on timings of the switch field effect transistor (Q1) and the freewheeling field effect transistor (Q2) to be opposite, and the feedback module is configured to provide a feedback voltage to the control module. The backlight source driving circuit is disposed in the display apparatus. By utilizing the field effect transistor as the freewheeling (Continued)

device in the backlight source driving circuit, the power consumption of the driving circuit is decreased effectively and an efficiency of the driving circuit is enhanced.

16 Claims, 3 Drawing Sheets

(51) Int. Cl.
G09G 3/32 (2016.01)
H05B 33/08 (2006.01)
G09G 3/34 (2006.01)

(52) U.S. Cl.
CPC ....... *H05B 33/0845* (2013.01); *G09G 3/3406* (2013.01); *G09G 2330/021* (2013.01); *Y02B 20/346* (2013.01)

(56) References Cited

U.S. PATENT DOCUMENTS

| | | | | |
|---|---|---|---|---|
| 5,025,204 | A * | 6/1991 | Su | G05F 3/22 323/273 |
| 5,111,148 | A * | 5/1992 | Senoo | G01R 19/16542 324/429 |
| 5,889,694 | A * | 3/1999 | Shepard | G11C 8/04 257/E27.073 |
| 6,169,533 | B1 * | 1/2001 | Tse | G09G 5/02 345/638 |
| 7,499,006 | B2 * | 3/2009 | Shirasaki | G09G 3/32 345/204 |
| 7,804,480 | B2 | 9/2010 | Jeon et al. | |
| 7,911,441 | B2 * | 3/2011 | Chao | G09G 3/32 345/102 |
| 8,664,904 | B2 * | 3/2014 | Suzuki | B62D 5/046 318/400.3 |
| 8,896,230 | B1 | 11/2014 | Zhang | |
| 9,241,377 | B2 * | 1/2016 | Zhang | H05B 33/0809 |
| 2003/0146888 | A1 * | 8/2003 | Yamazaki | G09G 3/2022 345/82 |
| 2003/0227452 | A1 * | 12/2003 | Hartular | H02J 7/0063 345/211 |
| 2008/0185975 | A1 * | 8/2008 | Chen | G05F 3/16 315/291 |
| 2012/0256561 | A1 | 10/2012 | Kwon | |

FOREIGN PATENT DOCUMENTS

| | | |
|---|---|---|
| CN | 1991961 A | 7/2007 |
| CN | 101314466 A | 12/2008 |
| CN | 101483951 A | 7/2009 |
| CN | 101834525 A | 9/2010 |
| CN | 102662093 A | 9/2012 |
| CN | 102956202 A | 3/2013 |
| CN | 103093729 A | 5/2013 |
| CN | 103165084 A | 6/2013 |
| CN | 103354083 A | 10/2013 |

OTHER PUBLICATIONS

English Translation of the International Search Report of PCT/CN2013/089153, dated Apr. 23, 2014.
International Search Report, International Preliminary Report on Patentability and Written Opinion of the International Searching Authority of PCT/CN2013/089153 in Chinese, dated Apr. 23, 2014.
English translation of the International Preliminary Report on Patentability and Written Opinion of the International Searching Authority of PCT/CN2013/089153, dated Jan. 12, 2016.

* cited by examiner

BACKLIGHT SOURCE DRIVING CIRCUIT AND DISPLAY APPARATUS

CROSS REFERENCE TO RELATED APPLICATIONS

This application is the National Stage of PCT/CN2013/089153 filed on Dec. 12, 2013, which claims priority under 35 U.S.C. § 119 of Chinese Application No. 201310291599.4 filed on Jul. 11, 2013, the disclosure of which is incorporated by reference.

TECHNICAL FIELD

The present disclosure relates to a field of liquid crystal display, and particularly, to a backlight source driving circuit and a display apparatus.

BACKGROUND

A backlight source is an important component part for a liquid crystal display device, and its power consumption and cost occupy a large proportion in the entire liquid crystal module.

In a backlight source circuit, the power consumption at a Light Emitting Diode LED is transformed into lights, which is an origin of the lights in the backlight source, while the power consumption in a driving circuit is transformed into the heat, which is not needed by the backlight source, and the generated heat would influence the stability as the backlight source operates. Decreasing of the power consumption in the driving circuit needs to improve an efficiency of the driving circuit as much as possible.

Generally, a backlight source driving circuit provides a constant operation current to the LED in a manner of a switch power supply. Herein, power consumptions of inductors and diodes occupy a large proportion in the backlight source driving circuit, and a decreasing of the power consumptions in these elements may provide more electrical energy to the LED and in turn realize an increasing of a driving efficiency. In a switch circuit, the diode is normally utilized as a freewheeling element, and when the diode is turned on, a certain voltage drop occurs across the diode, such that the power consumption in the diode is very large because a driving current of the entire backlight source flows through the diode.

SUMMARY

A technical problem to be solved by the present disclosure is how to provide a backlight source driving circuit and a display apparatus capable of decreasing the power consumption in the driving circuit and improving an efficiency of the driving circuit.

In order to settle the above technical problem, one scheme of the present disclosure provides a backlight source driving circuit comprising a switch field effect transistor, a freewheeling field effect transistor, a power supplying module, a control module, a LED group and a feedback module, the power supplying module is configured to supply power to the LED group, the control module is configured to control turn-on timings of the switch field effect transistor and the freewheeling field effect transistor to be opposite, and the feedback module is configured to provide a feedback voltage to the control module.

Optionally, the power supplying module comprises a first inductor and a direct-current power supply, one terminal of the first inductor is connected with the direct-current power supply, and the other terminal is connected with drains of the switch field effect transistor and the freewheeling field effect transistor.

Optionally, the control module comprises a first operational amplifier, a voltage follower circuit, an inverter circuit and a sawtooth wave circuit;

a source of the switch field effect transistor is grounded, a gate thereof is connected with an input terminal of the voltage follower circuit, a source of the freewheeling field effect transistor is connected with an input terminal of the LED group, a gate thereof is connected with an output terminal of the inverter circuit, input terminals of the voltage follower circuit and the inverter circuit are connected with an output terminal of the first operational amplifier, an opposite input terminal of the first operational amplifier is connected with an output terminal of the sawtooth wave circuit, and its positive input terminal is connected with an output terminal of the LED group.

Optionally, the feedback module comprises a first resistor, one terminal thereof is connected with the output terminal of the LED group and the positive input terminal of the first operational amplifier, and the other terminal thereof is grounded.

Optionally, the backlight source driving circuit further comprises a first capacitor, one end of the first capacitor is connected with the input terminal of the LED group and the source of the freewheeling field effect transistor, and the other end thereof is grounded.

Optionally, a turn-on voltage of the freewheeling field effect transistor is 0.2V.

Optionally, the sawtooth wave circuit comprises a time base integrated circuit, a second capacitor, a third capacitor, a fourth capacitor, a second resistor, a third resistor, a fourth resistor, a fifth resistor, a sixth resistor and a third field effect transistor;

a first pin of the time base integrated circuit is grounded, a fourth pin and an eighth pin thereof are connected with a power supply, a third pin thereof is float, a seventh pin thereof is connected with one terminals of the third resistor, the fourth resistor and the fifth resistor, a second pin and a sixth pin thereof are connected with the other terminal of the fourth resistor, a fifth pin thereof is connected with one end of the second capacitor; the other end of the second capacitor is grounded, the other terminal of the fourth resistor is further connected with one end of the third capacitor, the other end of the third capacitor is grounded, the other terminal of the third resistor is connected with one ends of the second resistor and the fourth capacitor, the other terminal of the second resistor is connected with the power supply and particularly is connected with a terminal at which the fourth pin and the eighth pin are connected with the power supply; the other terminal of the fifth resistor is connected with a gate of the third field effect transistor, a source of the third field effect transistor is connected with the power supply, the drain there of is connected with the other end of the fourth capacitor and one terminal of the sixth resistor, the other terminal of the sixth resistor is grounded, and the drain of the third field effect transistor functions as the output terminal of the sawtooth wave circuit.

Optionally, the time base integrated circuit is a NE555 time base integrated circuit.

Optionally, the voltage follower circuit comprises a second operational amplifier, a fifth capacitor, a sixth capacitor and a seventh resistor;

an output terminal of the second operational amplifier is the output terminal of the voltage follower circuit, its positive input terminal is the input terminal of the voltage follower circuit, and the output terminal of the second operational amplifier is connected with its opposite input terminal; one end of the sixth capacitor is connected with the output terminal of the second operational amplifier, and the other terminal thereof is connected with one end of the fifth capacitor and one terminal of the seventh resistor; the other end of the fifth capacitor is connected with a power supply terminal of the second operational amplifier, and the other terminal of the seventh resistor is grounded.

Optionally, the inverter circuit comprises a third operational amplifier, an eighth resistor, a ninth resistor, a tenth resistor and an eleventh resistor;

one terminal of the eighth resistor functions as the input terminal of the inverter circuit, and the other terminal thereof is connected with one terminals of the ninth resistor and the tenth resistor; the other terminal of the ninth resistor is connected with an output terminal of the third operational amplifier; the other terminal of the tenth resistor is connected with an opposite input terminal of the third operational amplifier; one terminal of the eleventh resistor is grounded, and the other terminal thereof is connected with a positive input terminal of the third operational amplifier; the output terminal of the third operational amplifier functions as the output terminal of the inverter circuit.

Another aspect of the present disclosure further provides a display apparatus comprising the backlight source driving circuit described above.

Following benefit effects can be obtained with solutions of the present disclosure. In the backlight source driving circuit and display apparatus according to the present disclosure, the field effect transistor is used as a freewheeling element in the backlight source driving circuit and the switching of the field effect transistor is controlled by the corresponding control signal, a power consumption in the driving circuit is reduced effectively and an efficiency of the driving circuit is further enhanced.

DETAILED DESCRIPTION

Figure 1:
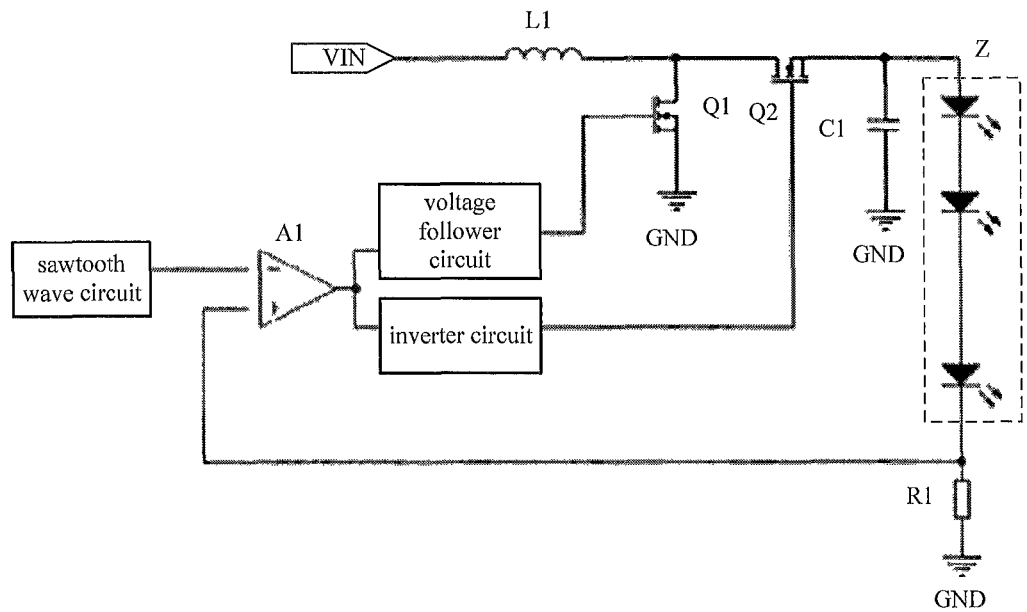
FIG. 1 is a wiring connection diagram of a backlight source driving circuit according to an embodiment of the present disclosure.

Detailed implementations of the present disclosure would be further described in details below in connection with drawings and embodiments. Following embodiments are only used to explain the present disclosure, but not to limit a scope of the present disclosure.

In order to decrease a power consumption in the driving circuit and enhancing the efficiency of the driving circuit, an embodiment of the present disclosure provides a backlight source driving circuit comprising a switch field effect transistor, a freewheeling field effect transistor, a power supplying module, a control module, a LED group and a feedback module, the power supplying module is configured to supply power to the LED group, the control module is configured to control turn-on timings of the switch field effect transistor and the freewheeling field effect transistor to be opposite, and the feedback module is configured to provide a feedback voltage to the control module.

In the backlight source driving circuit according to the embodiment of the present disclosure, the power supplying module may comprise a first inductor and a direct-current power supply, one terminal of the first inductor is connected with the direct-current power supply, and the other terminal is connected with drains of the switch field effect transistor and the freewheeling field effect transistor.

As an example, the control module may comprise a first operational amplifier, a voltage follower circuit, an inverter circuit and a sawtooth wave circuit;

a source of the switch field effect transistor is grounded, a gate thereof is connected with an input terminal of the voltage follower circuit, a source of the freewheeling field effect transistor is connected with an input terminal of the LED group, a gate thereof is connected with an output terminal of the inverter circuit, input terminals of the voltage follower circuit and the inverter circuit are connected with an output terminal of the first operational amplifier, an opposite input terminal of the first operational amplifier is connected with an output terminal of the sawtooth wave circuit, and its positive input terminal is connected with an output terminal of the LED group.

As an example, the feedback module may comprise a first resistor, one terminal thereof is connected with the output terminal of the LED group and the positive input terminal of the first operational amplifier, and the other terminal thereof is grounded.

As a further example and optionally, the backlight source driving circuit may further comprise a first capacitor, one end of the first capacitor is connected with the input terminal of the LED group and the source of the freewheeling field effect transistor, and the other terminal thereof is grounded.

In the backlight source driving circuit according to the embodiment of the present disclosure, the turn-on voltage of the freewheeling field effect transistor is 0.2V.

Optionally, in the backlight source driving circuit according to the embodiment of the present disclosure, the power supplying module may further be constructed by connecting the direct-current power supply and a plurality of inductors in series, and ends of the plurality of inductors connected in series are connected with the drains of the switch field effect transistor and the freewheeling field effect transistor; the feedback module may further be constructed by a plurality of resistors in series; the control module may further constructed with the first operational amplifier, the inverter circuit and the sawtooth wave circuit, that is to say, the voltage follower circuit is removed and the gate of the switch field effect transistor is connected with the output terminal of the first operational amplifier directly. The structures of the power supplying module, the control module and the feedback module can be modified and configured depending on actual requirements by those skilled in the art.

First Embodiment

FIG. 1 illustrates a backlight source driving circuit according to the embodiment of the present disclosure. The backlight source driving circuit comprises a switch field effect transistor Q1, a freewheeling field effect transistor Q2, a first inductor L1, a LED group Z, a first resistor R1, a first operational amplifier A1, a voltage follower circuit, an inverter circuit and a sawtooth wave circuit.

One terminal of the first inductor L1 is connected with a direct-current power supply VIN, and the other terminal is connected with drains of the switch field effect transistor Q1 and the freewheeling field effect transistor Q2. A source of the switch field effect transistor Q1 is grounded, a gate thereof is connected with an input terminal of the voltage follower circuit, a source of the freewheeling field effect transistor Q2 is connected with an input terminal of the LED group Z, a gate thereof is connected with an output terminal of the inverter circuit. Input terminals of the voltage follower circuit and the inverter circuit are connected with an output terminal of the first operational amplifier A1, an inverting input terminal of the first operational amplifier A1 is connected with an output terminal of the sawtooth wave circuit, and its non-inventing input terminal is connected with an output terminal of the LED group Z. One terminal of the first resistor R1 is connected with the output terminal of the LED group Z and the non-inverting input terminal of the first operational amplifier A1, and the other terminal thereof is grounded.

The sawtooth wave circuit is configured to generate a sawtooth wave with a certain amplitude and a certain frequency.

The voltage follower circuit is configured to form a voltage following circuit with the operational amplifier, which may output an input voltage value integrally.

The inverter circuit is configured to form, with the operational amplifier, a circuit whose voltage is opposite, which may output the input voltage value in an opposite phase.

In the present embodiment, after the current flows through the first resistor, a voltage drop is generated across the first resistor, and thus a feedback voltage is generated. The sawtooth wave with the certain amplitude and the certain frequency generated by the sawtooth wave circuit is input into the first operational amplifier A1 in combination with the feedback voltage, which are subject to an operating process in the first operational amplifier A1 thereby a control signal is output, and the inputted control signal is output integrally by the voltage follower circuit in order to control the switch field effect transistor; and the inputted control signal is output in the opposite phase by the inverter circuit to control the freewheeling field effect transistor. During the switch field effect transistor Q1 is turned on, the direct-current power supply charges the first inductor L1, and after a certain period of time elapses, the switch field effect transistor Q1 is turned off while the freewheeling field effect transistor Q2 is turned on, the first inductor L1 transfers the electrical energy to the LED group Z via the freewheeling field effect transistor Q2, so as to provide the stable output to the LED group Z.

The control signal output from the first operational amplifier A1 is transferred to the switch field effect transistor Q1 and the freewheeling field effect transistor Q2, to control the switching of the field effect transistors. Because the turn-on timings of the switch field effect transistor Q1 and the freewheeling field effect transistor Q2 are opposite, that is: the freewheeling field effect transistor Q2 is turned off when the switch field effect transistor Q1 is turned on, while the freewheeling field effect transistor Q2 is turned on when the switch field effect transistor Q1 is turned off, it is necessary for the phases of the control signals for these two field effect transistors to be opposite. In the present embodiment, the signal output from the first operational amplifier A1 is inverted by one inverter circuit and then is loaded to the gate of the freewheeling field effect transistor Q2.

Figure 2:
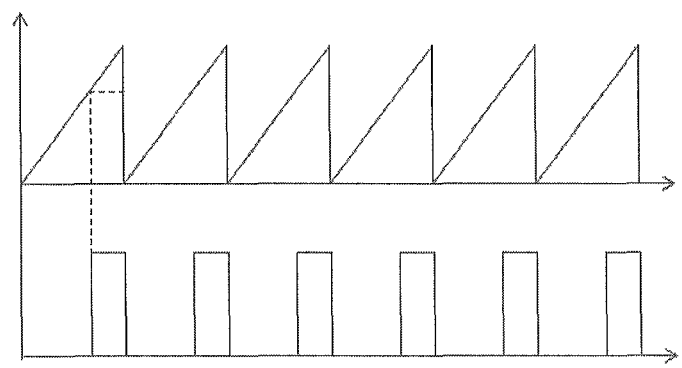
FIG. 2 is a waveform diagram of a sawtooth wave in the backlight source driving circuit according to the embodiment of the present disclosure.

Specifically, a waveform of the sawtooth wave generated by the sawtooth wave circuit is as shown in FIG. 2, where the upper half part thereof is the waveform of the sawtooth wave and the lower half part thereof is a waveform of a square wave identified and processed correspondingly. The square wave identified and processed, and the feedback voltage are input to the first operational amplifier A1 collectively, and subjected to the operating process in the first operational amplifier A1, so that the control signal is output. The inputted control signal is output integrally by the voltage follower circuit, and an inverted control signal is output by the inverter circuit.

Figure 3:
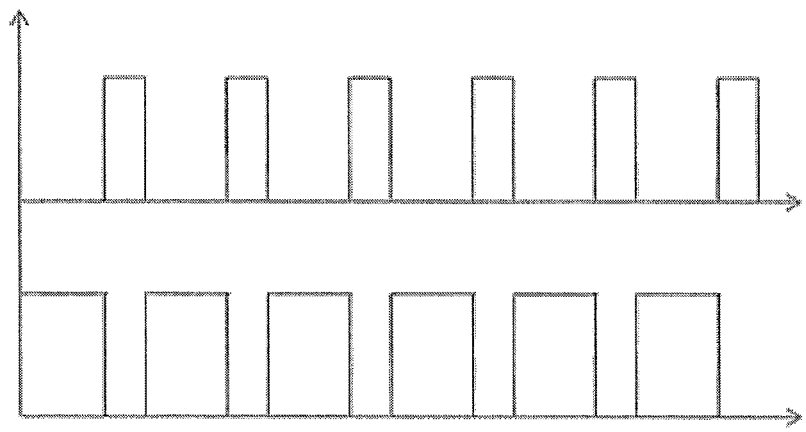
FIG. 3 is an output waveform diagram of a voltage follower circuit and an inverter circuit in the backlight source driving circuit according to the embodiment of the present disclosure.

As illustrated in FIG. 3, the upper half part in the figure is the complete control signal output from the voltage follower circuit and the lower half part is the inverted control signal output from the inverter circuit. It can be seen from FIG. 3 that, the waveforms of the output signals of the upper half part and the lower half part are opposite. Since the signal output from the voltage follower circuit controls the switch field effect transistor Q1 while the signal output from the inverter circuit controls the freewheeling field effect transistor Q2, the turn-on timings of the switch field effect transistor Q1 and the freewheeling field effect transistor Q2 are opposite, that is to say: the freewheeling field effect transistor Q2 is turned off when the switch field effect transistor Q1 is turned on, while the freewheeling field effect transistor Q2 is turned on when the switch field effect transistor Q1 is turned off. During the switch field effect transistor Q1 is turned-on, the first inductor is charged by the direct-current power supply, and during the switch field effect transistor Q1 is turned-off, the freewheeling field effect transistor Q2 is turned on, the first inductor transfers the electrical energy to the LED group Z via the freewheeling field effect transistor Q2 to provide the stable output to the LED group Z.

A duty ratio of the output waveform of the first operational amplifier A1 decides the charging time of the first inductor L1, and thus decides whether amplitude of the voltage output from the driving circuit is high or low. The duty ratio is adjusted depending on the different feedback voltage. If the current output to the LED group Z increases, the current flowing through the first resistor R1 increases too, the feedback voltage also increases, then the duty ratio of the square wave output from the first operational amplifier A1 is decreased, so that the output voltage from the driving circuit is decreased; if the current output to the LED group Z decreases, the current flowing through the first resistor R1 decreases too, the feedback voltage also decreases, then the duty ratio of the square wave output from the first operational amplifier A1 is increased, so that the output voltage from the driving circuit is increased.

Optionally, the backlight source driving circuit further comprises a first capacitor C1, which is configured to reduce fluctuations in the voltage output to the LED group Z from the direct-current power supply via the first inductor L1, one end of the first capacitor is connected with the input terminal of the LED group Z and the source of the freewheeling field effect transistor, and the other terminal is grounded.

Optionally, the turn-on voltage of the freewheeling field effect transistor is 0.2V.

In a traditional switch circuit, a freewheeling device is usually a diode, and a turn-on voltage drop of the diode is about 0.5V, and a product of a load current and the turn-on voltage drop is a power consumption of the diode, a turn-on voltage drop of the field effect transistor is 0.2V, and the power consumption can be reduced by above 50% under the same load current. By utilizing the field effect transistor as the freewheeling element in the backlight source driving circuit and controlling the switching of the field effect transistor with the respective control signal, the power consumption in the driving circuit is decreased effectively and the efficiency of the driving circuit is enhanced.

Second Embodiment

Figure 4:
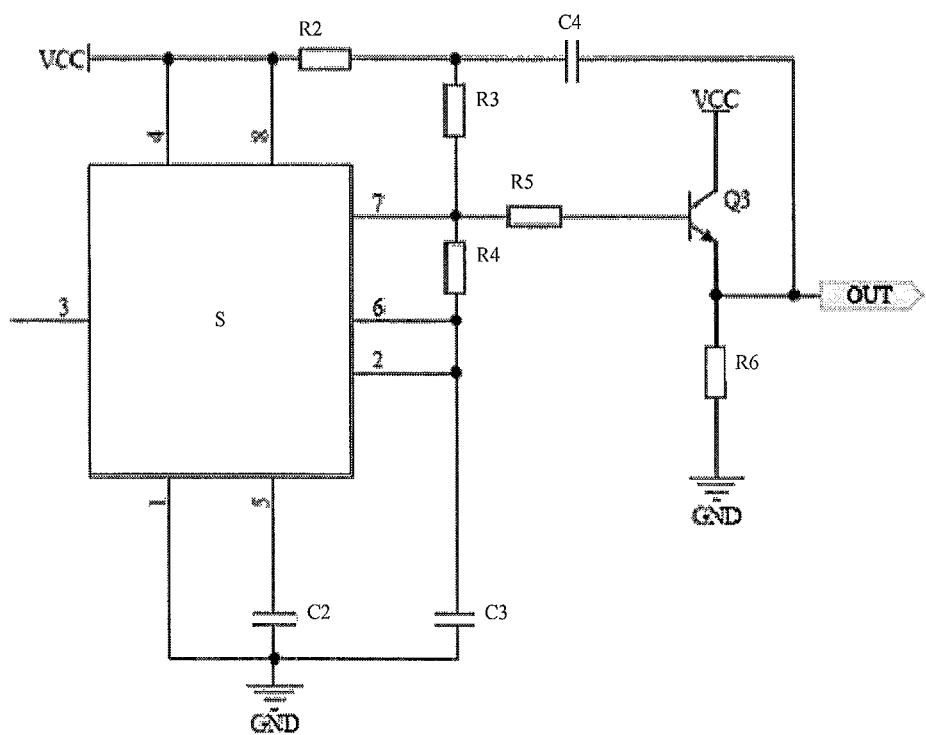
FIG. 4 is a wiring connection diagram of a sawtooth wave circuit in the backlight source driving circuit according to the embodiment of the present disclosure.

FIG. 4 shows a wiring connection diagram of a sawtooth wave circuit in the backlight source driving circuit according to the embodiment of the present disclosure. As illustrated in FIG. 4, in the backlight source driving circuit according to the embodiment of the present disclosure, the sawtooth wave circuit may comprise a time base integrated circuit S, a second capacitor C2, a third capacitor C3, a fourth capacitor C4, a second resistor R2, a third resistor R3, a fourth resistor R4, a fifth resistor R5, a sixth resistor R6 and a third field effect transistor Q3.

A first pin of the time base integrated circuit S is grounded, a fourth pin and an eighth pin thereof are connected with a power supply VCC, a third pin thereof is vacant, a seventh pin thereof is connected with one terminals of the third resistor R3, the fourth resistor R4 and the fifth resistor R5, a second pin and a sixth pin thereof are connected with the other terminal of the fourth resistor R4, a fifth pin thereof is connected with one end of the second capacitor C2; the other end of the second capacitor C2 is grounded, the other terminal of the fourth resistor R4 is further connected with one end of the third capacitor C3, the other end of the third capacitor C3 is grounded, the other terminal of the third resistor R3 is connected with one ends of the second resistor R2 and the fourth capacitor C4, the other terminal of the second resistor R2 is connected with the power supply VCC and is connected with a terminal at which the fourth pin and the eighth pin are connected with the power supply; the other terminal of the fifth resistor R5 is connected with a gate of the third field effect transistor Q3, the drain of the third field effect transistor Q3 is connected with the power supply VCC, the source thereof is connected with the other end of the fourth capacitor C4 and one terminal of the sixth resistor R6, the other terminal of the sixth resistor R6 is grounded, and the source of the third field effect transistor Q3 functions as the output terminal of the sawtooth wave circuit.

Optionally, the time base integrated circuit is a NE555 time base integrated circuit.

Third Embodiment

Figure 5:
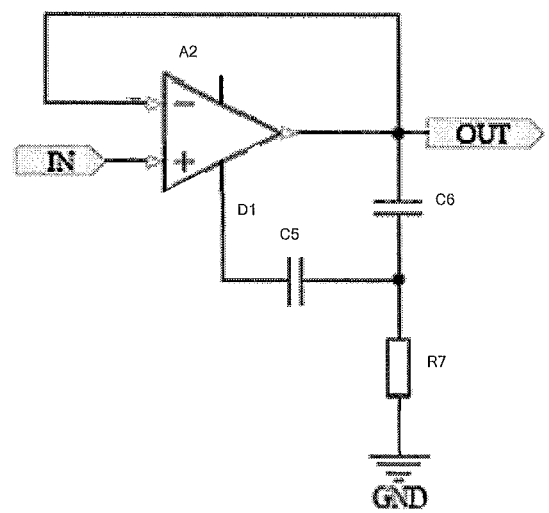
FIG. 5 is wiring connection diagram of the voltage follower circuit in the backlight source driving circuit according to the embodiment of the present disclosure.

FIG. 5 shows wiring connection diagram of the voltage follower circuit in the backlight source driving circuit according to the embodiment of the present disclosure. As illustrated in FIG. 5, in the backlight source driving circuit according to the embodiment of the present disclosure, the voltage follower circuit may comprise a second operational amplifier A2, a fifth capacitor C5, a sixth capacitor C6 and a seventh resistor R7.

An output terminal of the second operational amplifier A2 is the output terminal of the voltage follower circuit, a non-inverting input terminal of the second operational amplifier A2 is the input terminal of the voltage follower circuit, and the output terminal of the second operational amplifier A2 is connected with an inverting input terminal; one end of the sixth capacitor C6 is connected with the output terminal of the second operational amplifier A2, and the other terminal thereof is connected with one end of the fifth capacitor C5 and one terminal of the seventh resistor R7; the other end of the fifth capacitor C5 is connected with a power supply terminal D1 of the second operational amplifier A2, and the other terminal of the seventh resistor R7 is grounded.

Fourth Embodiment

Figure 6:
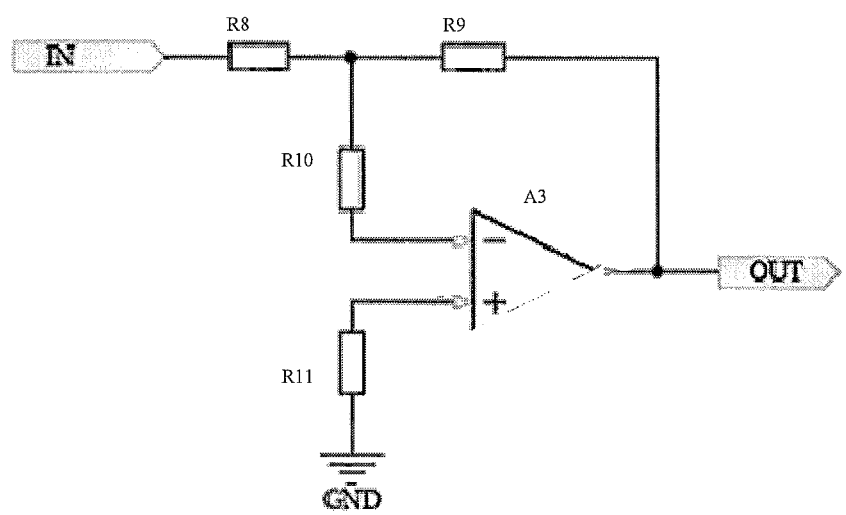
FIG. 6 is a wiring connection diagram of the inverter circuit in the backlight source driving circuit according to the embodiment of the present disclosure.

FIG. 6 shows a wiring connection diagram of the inverter circuit in the backlight source driving circuit according to the embodiment of the present disclosure. As illustrated in FIG. 6, in the backlight source driving circuit according to the embodiment of the present disclosure, the inverter circuit may comprise a third operational amplifier A3, an eighth resistor R8, a ninth resistor R9, a tenth resistor R10 and an eleventh resistor R11.

One terminal of the eighth resistor R8 functions as the input terminal of the inverter circuit, and the other terminal thereof is connected with one terminal of the ninth resistor R9 and one terminal of the tenth resistor R10; the other terminal of the ninth resistor R9 is connected with an output terminal of the third operational amplifier A3; the other terminal of the tenth resistor R10 is connected with an inverting input terminal of the third operational amplifier A3; one terminal of the eleventh resistor R11 is grounded, and the other terminal thereof is connected with a non-inverting input terminal of the third operational amplifier A3; the output terminal of the third operational amplifier A3 is the output terminal of the inverter circuit.

According to another embodiment of the present disclosure, there is further provided a display apparatus comprising the backlight source driving circuit described above. The display apparatus may be a liquid crystal panel, a piece of electrical paper, an OLED panel, a liquid crystal television, a liquid crystal display, a digital photo frame, a mobile phone, a tablet computer and any other products or parts having a display function.

It should be noted that there are no significant differences between the drain and the source for the transistor in the display field, therefore the source of the transistor mentioned in the embodiment of the present disclosure can be the drain of the transistor and the drain of the transistor can also be the source of the transistor.

The above-described embodiments are just used to illustrate the present disclosure, but not to limit the present disclosure. Those ordinary skilled in the art can make many modifications and variations without departing from a spirit and scope of the present disclosure, therefore all of equivalent solutions should also be considered to fall into the scope of the present disclosure and the scope sought for protection by the present disclosure should be defined by Claims attached.

What is claimed is:
1. A backlight source driving circuit, comprising:
a switch field effect transistor, a freewheeling field effect transistor, a power supplying module, a control module, a light emitting diode (LED) group and a feedback module, wherein the power supplying module is configured to supply power to the LED group, the control module is configured to control turn-on timings of the switch field effect transistor and the freewheeling field effect transistor to be opposite, and the feedback module is configured to provide a feedback voltage to the control module, the power supplying module comprises a first inductor and a direct-current power supply, one terminal of the first inductor is connected with the direct-current power supply, and other terminal of the first inductor is connected with drains of the switch field effect transistor and the freewheeling field effect transistor, wherein the control module comprises a first operational amplifier, a voltage follower circuit, an inverter circuit and a sawtooth wave circuit;

a source of the switch field effect transistor is grounded, a gate of the switch field effect transistor is connected with an output terminal of the voltage follower circuit, a source of the freewheeling field effect transistor is connected with an input terminal of the LED group, a gate of the freewheeling field effect transistor is connected with an output terminal of the inverter circuit, an input terminal of the voltage follower circuit and an input terminal of the inverter circuit are connected with an output terminal of the first operational amplifier, an inverting input terminal of the first operational amplifier is connected with an output terminal of the sawtooth wave circuit, and an non-inverting input terminal of the first operational amplifier is connected with an output terminal of the LED group.

2. The backlight source driving circuit of claim 1, wherein the power supplying module further comprises a plurality of inductors connected in series, wherein ends of the plurality of inductors connected in series are connected with drains of the switch field effect transistor.

3. The backlight source driving circuit of claim 1, wherein the feedback module comprises a first resistor including one terminal, wherein the terminal of the first resistor is connected with the output terminal of the LED group and the non-inverting input terminal of the first operational amplifier, and other terminal of the first resistor is grounded.

4. The backlight source driving circuit of claim 3, wherein the first resistor comprises a plurality of resistors connected in series.

5. The backlight source driving circuit of claim 1, wherein a gate of the switch field effect transistor is directly connected with the output terminal of the first operational amplifier.

6. The backlight source driving circuit of claim 1, wherein the backlight source driving circuit further comprises a first capacitor including one terminal, wherein the terminal of the first capacitor is connected with the input terminal of the LED group and the source of the freewheeling field effect transistor, and other terminal of the first capacitor is grounded.

7. The backlight source driving circuit of claim 1, wherein a turn-on voltage of the freewheeling field effect transistor is 0.2V.

8. The backlight source driving circuit of claim 1, wherein the sawtooth wave circuit comprises a time base integrated circuit, a second capacitor, a third capacitor, a fourth capacitor, a second resistor, a third resistor, a fourth resistor, a fifth resistor, a sixth resistor and a third field effect transistor; a first pin of the time base integrated circuit is grounded, a fourth pin and an eighth pin of the time base integrated circuit are connected with a power supply, a third pin of the time base integrated circuit is vacant, a seventh pin of the time base integrated circuit is connected with one terminals of the third resistor, the fourth resistor and the fifth resistor, a second pin and a sixth pin of the time base integrated circuit are connected with other terminal of the fourth resistor, a fifth pin of the time base integrated circuit is connected with one end of the second capacitor; other end of the second capacitor is grounded, the other terminal of the fourth resistor is further connected with one end of the third capacitor, other end of the third capacitor is grounded, other terminal of the third resistor is connected with one terminal of the second resistor and one end of the fourth capacitor, other terminal of the second resistor is connected with the power supply and is connected with a terminal at which the fourth pin and the eighth pin are connected with the power supply; other terminal of the fifth resistor is connected with a gate of the third field effect transistor, a source of the third field effect transistor is connected with the power supply, a drain of the third field effect transistor is connected with other end of the fourth capacitor and one terminal of the sixth resistor, other terminal of the sixth resistor is grounded, and the drain of the third field effect transistor is the output terminal of the sawtooth wave circuit.

9. The backlight source driving circuit of claim 8, wherein the time base integrated circuit is a time base integrated circuit of NE555.

10. The backlight source driving circuit of claim 1, wherein the voltage follower circuit comprises a second operational amplifier, a fifth capacitor, a sixth capacitor and a seventh resistor; an output terminal of the second operational amplifier is the output terminal of the voltage follower circuit, an non-inverting input terminal of the second operational amplifier is the input terminal of the voltage follower circuit, and the output terminal of the second operational amplifier is connected with an inverting input terminal; one end of the sixth capacitor is connected with the output terminal of the second operational amplifier, and other terminal of the sixth capacitor is connected with one end of the fifth capacitor and one terminal of the seventh resistor; other end of the fifth capacitor is connected with a power supply terminal of the second operational amplifier, and other terminal of the seventh resistor is grounded.

11. The backlight source driving circuit of claim 1, wherein the inverter circuit comprises a third operational amplifier, an eighth resistor, a ninth resistor, a tenth resistor and an eleventh resistor; one terminal of the eighth resistor is the input terminal of the inverter circuit, and other terminal of the eighth resistor is connected with one terminals of the ninth resistor and the tenth resistor; other terminal of the ninth resistor is connected with an output terminal of the third operational amplifier; other terminal of the tenth resistor is connected with an inverting input terminal of the third operational amplifier; one terminal of the eleventh resistor is grounded, and other terminal of the eleventh resistor is connected with a non-inverting input terminal of the third operational amplifier; the output terminal of the third operational amplifier is the output terminal of the inverter circuit.

12. A display apparatus comprising:
a backlight source driving circuit,
wherein the backlight source driving circuit comprises a switch field effect transistor, a freewheeling field effect transistor, a power supplying module, a control module, a light emitting diode (LED) group and a feedback module, wherein the power supplying module is configured to supply power to the LED group, the control module is configured to control turn-on timings of the switch field effect transistor and the freewheeling field effect transistor to be opposite, and the feedback module is configured to provide a feedback voltage to the control module, the power supplying module comprises a first inductor and a direct-current power supply, one terminal of the first inductor is connected with the direct-current power supply, and other terminal of the first inductor is connected with drains of the switch field effect transistor and the freewheeling field effect transistor, wherein the control module comprises a first operational amplifier, a voltage follower circuit, an inverter circuit and a sawtooth wave circuit;

a source of the switch field effect transistor is grounded, a gate of the switch field effect transistor is connected with an output terminal of the voltage follower circuit, a source of the freewheeling field effect transistor is connected with an input terminal of the LED group, a gate of the freewheeling field effect transistor is connected with an output terminal of the inverter circuit, an input terminal of the voltage follower circuit and an input terminal of the inverter circuit are connected with an output terminal of the first operational amplifier, an inverting input terminal of the first operational amplifier is connected with an output terminal of the sawtooth wave circuit, and an non-inverting input terminal of the first operational amplifier is connected with an output terminal of the LED group.

13. The display apparatus of claim 12, wherein the power supplying module further comprises a plurality of inductors connected in series, wherein ends of the plurality of inductors connected in series are connected with drain of the switch field effect transistor.

14. The display apparatus of claim 12, wherein the feedback module comprises a first resistor including one terminal, wherein the terminal of the first resistor is connected with the output terminal of the LED group and the non-inverting input terminal of the first operational amplifier, and other terminal of the first resistor is grounded.

15. The display apparatus of claim 14, wherein the first resistor comprises a plurality of resistors connected in series.

16. The display apparatus of claim 12, wherein a gate of the switch field effect transistor is directly connected with an output terminal of the first operational amplifier.

* * * * *